UNITED STATES PATENT OFFICE.

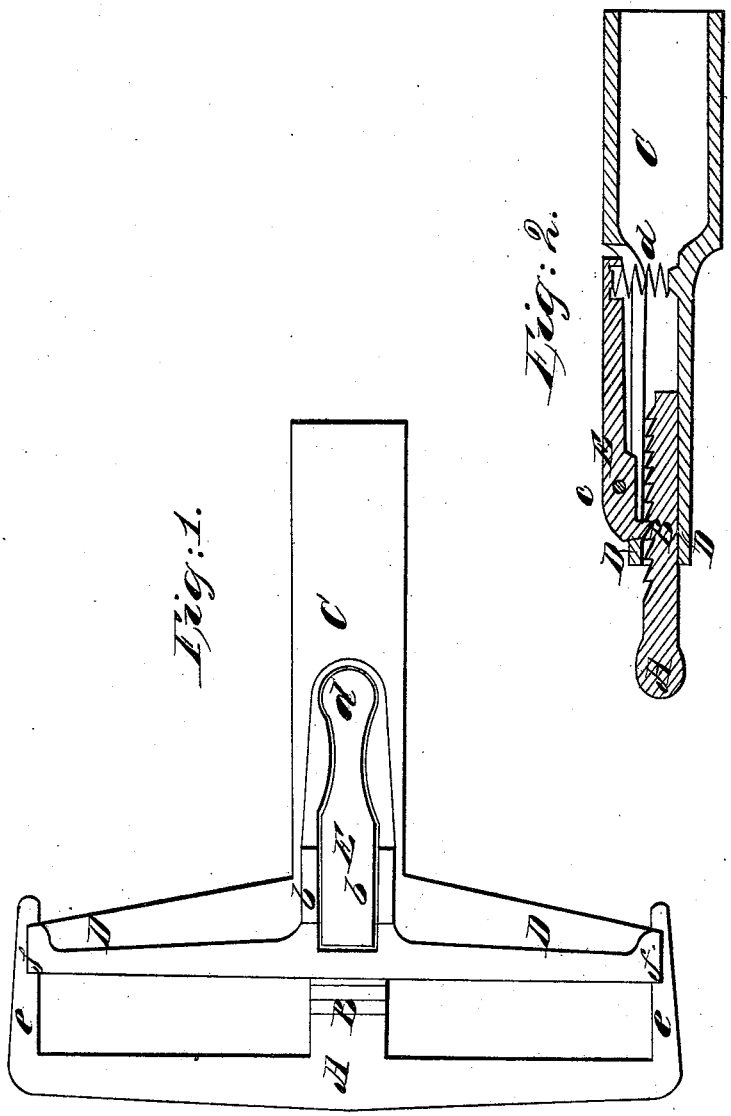

MARCUS L. HORTON, OF CLAREMONT, NEW HAMPSHIRE.

IMPROVED MOP-HEAD.

Specification forming part of Letters Patent No. 34,687, dated March 18, 1862.

*To all whom it may concern:*

Be it known that I, MARCUS L. HORTON, of the town of Claremont, county of Sullivan, and State of New Hampshire, have invented a new and useful Improved Mop-Head; and I do hereby declare that the following is a full and exact description thereof, reference being had to the accompanying drawings, and to the letters of reference marked thereon, the same letters in each figure designating like parts of the machine, and in which—

Figure 1 is a plan view. Fig. 2 is a section of the handle portion of the head with the dog and spring and ratchet.

To enable others skilled in the art to make and use my invention, I will proceed to describe its construction and operation.

In the construction, A in Fig. 1 is the sliding head or portion of the invention having in its center the ratchet-arm B for sliding into the handle part of the head C. It is of a T shape, with short arms at each end sliding in grooves on the ends of the handle portion of the head.

D is the handle part of the head grooved in front and at each end for the movable portion to fit into or into which the material of which the mop is made is compressed in front, so as to hold the mop firmly in position when the mop is completed; E, the dog operating in a slot in the handle portion of the head, as seen at $a$, and has its bearing at $b$ by means of shaft $c$, which acts as its fulcrum, and which is pressed up, so as to cause the front and inner end of the dog to catch in the ratchet B. This spring is shown in Fig. 2, letter $d$.

In the operation of my invention the mop is placed on the sliding portion of the head A between the arms, leaving the ratchet-arm B bare, or it may be placed on the handle part of the head, leaving the socket exposed. Then the arm A is made to enter the socket in part C, keeping the arms $e$ in the grooves $f$ at the ends of the portion C, and then pressed firmly together, the dog yielding as it passes in, and when sufficiently forced in the dog then, by means of the spring, catches into the ratchet and holds it firmly in place. A handle is then inserted into the socket of part C, and the mop is ready for use. If it is necessary to enlarge the mop, it can be done by pressing on the end of the dog above the spring, which will detach its hold on the ratchet, when it can be slid out and the mop enlarged by adding more material to it, or the mop can be renewed in the same way by taking out the worn-out material and placing new in its place.

By this invention I am able to make a cheap and excellent mop, and one head, with care, may last a long time.

Having thus described the nature of my invention, what I claim as new, and desire to secure by Letters Patent, is—

The combination of the parts A and C and adjusting them or firmly holding them in any required position by means of the ratchet-arm B, dog E, and spring $d$, operating as described, and for the purposes set forth.

MARCUS L. HORTON.

Witnesses:
 EDWARD D. BAKER,
 SETH PAULL.